3,276,954
METHOD FOR CONTROLLING BACTERIA AND FUNGI
Francis X. O'Shea, Wolcott, Bogislav von Schmeling, Hamden, and Mitchell D. Dudarevitch, Cheshire, Conn., assignors to United States Rubber Company, New York, N.Y., a corporation of New Jersey
No Drawing. Filed June 9, 1965, Ser. No. 462,732
18 Claims. (Cl. 167—30)

This invention relates to fungicides and bactericides, more particularly to agricultural and industrial microbicides.

The chemicals of the present invention which show such biocidal activity may be represented by the general formula

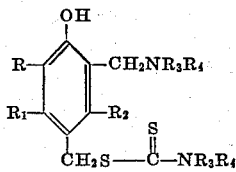

wherein R is an alkyl radical of up to 12 carbon atoms or a cycloalkyl radical of 5 to 8 carbon atoms or an aralkyl radical of 7 to 9 carbon atoms, $R_1$ and $R_2$ are hydrogen or methyl, and $R_3$ and $R_4$ are alkyl radicals having up to 5 carbon atoms each or are radicals in which $R_3$ and $R_4$ are joined to form with the nitrogen atom a radical selected from the group consisting of morpholinyl, pyrrolidinyl and piperidinyl radicals.

The compounds of the present invention and their preparation are disclosed and claimed as new chemicals in the copending application Serial No. 462,745, filed June 9, 1965 of Francis X. O'Shea. The compounds are prepared by reacting one molar equivalent of a phenolic compound of the formula

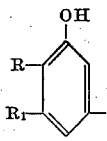

wherein R, $R_1$ and $R_2$ are as above described, with two molar equivalents of formaldehyde, two molar equivalents of a secondary amine of the formula $R_3R_4NH$ in which $R_3$ and $R_4$ are as above described and one molar equivalent of carbon disulfide in an alcohol solvent. The overall equation for the reaction is:

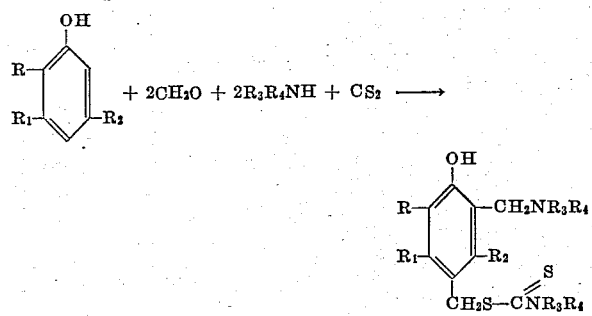

The hydrocarbon substituted phenols which may be used include o-cresol,
o-ethylphenol,
o-isopropylphenol,
o-t-butylphenol,
o-t-amylphenol,
o-(alpha-methylpentyl)phenol,
o-(alpha-methylheptyl)phenol,
o-(alpha-methylnonyl)phenol,
o-(alpha-methylundecyl)phenol,
o-cyclohexylphenol,
o-(methylcyclohexyl)phenol,
o-cyclooctylphenol,
o-benzylphenol,
o-(alpha-methylbenzyl)phenol,
o-(alpha,alpha-dimethylbenzyl)phenol,
2,3-dimethylphenol,
2,5-dimethylphenol,
2,3,5-trimethylphenol,
6-isopropyl-m-cresol,
2-isopropyl-3,5-dimethylphenol,
6-t-butyl-m-cresol,
2-t-butyl-3,5-dimethylphenol,
6-sec-butyl-m-cresol,
2-sec-butyl-3,5-dimethylphenol,
6-(alpha-methylpentyl)-m-cresol,
2-(alpha-methylpentyl)-3,5-dimethylphenol,
6-t-amyl-m-cresol,
2-t-amyl-3,5-dimethylphenol,
6-(alpha-methylheptyl)-m-cresol,
2-(alpha-methylheptyl)-3,5-dimethylphenol,
6-(alpha-methylnonyl)-m-cresol,
2-(alpha-methylnonyl)-3,5-dimethylphenol,
6-(alpha-methylundecyl)-m-cresol,
2-(alpha-methylundecyl)-3,5-dimethylphenol,
6-t-octyl-m-cresol,
2-t-octyl-3,5-dimethylphenol,
6-cyclohexyl-m-cresol,
2-cyclohexyl-3,5-dimethylphenol,
6-cyclooctyl-m-cresol,
2-cyclooctyl-3,5-dimethylphenol,
6-benzyl-m-cresol,
2-benzyl-3,5-dimethylphenol,
6-(alpha-methylbenzyl)-m-cresol,
2-(alpha-methylbenzyl)-3,5-xylenol.

The preferred phenols are o-alkylphenols in which the alkyl group contains from one to four carbon atoms such as o-cresol and o-t-butylphenol. The secondary amines which may be used include dimethylamine, methylethylamine, diethylamine, dibutylamine, diamylamine, morpholine, pyrrolidine and piperidine. The preferred amine is dimethylamine.

The following chemicals are illustrative of the compounds of the present invention using the above referred hydrocarbon substituted phenols and secondary amines in their preparation:

3-methyl-4-hydroxy-5-(dimethylaminomethyl)benzyl N,N-dimethyldithiocarbamate
3-t-butyl-4-hydroxy-5-(dimethylaminomethyl)benzyl N,N-dimethyldithiocarbamate
3-cyclohexyl-4-hydroxy-5-(dimethylaminomethyl)benzyl N,N-dimethydithiocarbamate
3-cyclooctyl-4-hydroxy-5-(dimethylaminomethyl)benzyl N,N-dimethyldithiocarbamate
3-isopropyl-4-hydroxy-5-(dimethylaminomethyl)benzyl N,N-dimethyldithiocarbamate
3-sec-butyl-4-hydroxy-5-(dimethylaminomethyl)benzyl N,N-dimethyldithiocarbamate
3-(alpha-methylnonyl)-4-hydroxy-5-(dimethylaminomethyl)benzyl N,N-dimethyldithiocarbamate
2,5-dimethyl-3-(dimethylaminomethyl)-4-hydroxybenzyl N,N-dimethyldithiocarbamate
2,3-dimethyl-4-hydroxy-5-(dimethylaminomethyl)benzyl N,N-dimethyldithiocarbamate
3-methyl-4-hydroxy-5-(dibutylaminomethyl)benzyl N,N-dibutyldithiocarbamate
3-methyl-4-hydroxy-5-(ethylisopropylaminomethyl)-benzyl N-ethyl-N-isopropyldithiocarbamate
3-methyl-4-hydroxy-5-[di(beta-hydroxyethyl)aminomethyl]-benzyl N,N-di(beta-hydroxyethyl)dithiocarbamate
2-t-butyl-4-(morpholinothiocarbonylthiomethyl)-6-(morpholinomethyl)phenol
2-t-butyl-4-(piperidinothiocarbonylthiomethyl)-6-(piperidinomethyl)phenol
2-methyl-4-(morpholinothiocarbonylthiomethyl)-6-(morpholinomethyl)phenol
2-methyl-4-(piperidinothiocarbonylthiomethyl)-6-(piperidinomethyl)phenol
2,6-dimethyl-3-(alpha,alpha-dimethylbenzyl)-4-hydroxy-5-(dimethylaminomethyl)benzyl N,N-dimethyldithiocarbamate
2,6-dimethyl-3-(alpha-methylundecyl)-4-hydroxy-5-(dimethylaminomethyl)benzyl N,N-dimethyldithiocarbamate The following Examples 1 to 11 illustrate the preparation of the present compounds. Examples 12 to 15 illustrate the effectiveness of the compounds as fungicides and bactericides according to the present invention. All parts and percentages referred to herein are by weight.

EXAMPLE 1

*The preparation of 3-methyl-4-hydroxy-5-(dimethylaminomethyl)benzyl N,N-dimethyldithiocarbamate*

To a solution of 54 g. (0.5 mole) of o-cresol and 190 g. (1.05 moles) of 25% dimethylamine in 250 ml. of ethanol was added 84 g. (1.05 moles) of 37% aqueous formaldehyde dropwise with cooling to keep the temperature below 30° C. To the solution was then added 38 g. (0.5 mole) of carbon disulfide and the solution was heated under reflux for three hours. The solution was then cooled and poured into water. The product which separated was extracted with ether.

The ether solution was shaken with a solution of 50 ml. of concentrated HCl in 200 ml. of water. The ether layer from this extraction yielded a solid precipitate which was filtered off, washed with hexane and dried, wt.=15 g. This is the by-product 2-methyl-4,6-bis(dimethylthiocarbamylthiomethyl)phenol, M.P.—123–125° C.

The aqueous layer from the extraction was neutralized with aqueous sodium bicarbonate. The solid precipitate which formed was extracted with an ether-benzene mixture, dried with anhydrous sodium sulfate and evaporated down to a solid residue of 3-methyl-4-hydroxy-5-(dimethylaminomethyl)benzyl N,N - dimethyldithiocarbamate weighing 92 g. (62%), M.P. 98–99° C. after recrystallization from methanol.

*Anal.*—Calc'd for $C_{14}H_{22}N_2OS_2$: C, 56.4%; H, 7.39%; N, 9.39%; S, 21.45%. Found: C, 56.3%; H, 7.48%; N, 9.40%; S, 21.23%.

EXAMPLE 2

*The preparation of 3-t-butyl-4-hydroxy-5-(dimethylaminomethyl)benzyl N,N-dimethyldithiocarbamate*

Using the method described in Example 1, o-t-butylphenol was converted to 3-t-butyl-4-hydroxy-5-(dimethylaminomethyl)benzyl N,N - dimethyldithiocarbamate in 58% yield, M.P. 113–115° C.

*Anal.*—Calc'd for $C_{17}H_{28}N_2OS_2$: C, 60.0%; H, 8.24%; N, 8.24%; S, 18.80%. Found: C, 60.29%; H, 8.16%; N, 8.50%; S, 18.66%.

EXAMPLE 3

*The preparation of 3-isopropyl-4-hydroxy-5-(dimethylaminomethyl)benzyl N,N-dimethyldithiocarbamate*

Using the method described in Example 1, o-isopropylphenol was converted to 3-isopropyl-4-hydroxy-5-(dimethylaminomethyl)benzyl N,N - dimethyldithiocarbamate in 57% yield, M.P. 79–80° C. after recrystallization from ethanol.

*Anal.*—Calc'd for $C_{16}H_{26}N_2OS_2$: N, 8.59%; S, 19.62%. Found: N, 8.5%; S, 19.62%.

EXAMPLE 4

*The preparation of 3-sec-butyl-4-hydroxy-5-(dimethylaminomethyl)benzyl N,N-dimethyldithiocarbamate*

Using the method described in Example 1, o-sec-butylphenol was converted to 3-sec-butyl-4-hydroxy-5-(dimethylaminomethyl)benzyl N,N-dimethyldithiocarbamate in 50% yield, M.P. 90–91° C. after recrystallization from ethanol.

*Anal.*—Calc'd for $C_{17}H_{28}N_2OS_2$: N, 8.24%; S, 18.80%. Found: N, 8.20%; S, 19.11%.

EXAMPLE 5

*The preparation of 3-(alpha-methylnonyl)-4-hydroxy-5-(dimethylaminomethyl)benzyl N,N - dimethyldithiocarbamate*

Using the method described in Example 1, o-(alpha-methylnonyl)phenol was converted to 3-(alpha-methylnonyl) - 4 - hydroxy-5-(dimethylaminomethyl) phenol in 72% yield. The product was a viscous oil.

EXAMPLE 6

*The preparation of 2,5-dimethyl-3-(dimethylaminomethyl)-4-hydroxybenzyl N,N-dimethyldithiocarbamate*

To a solution of 122 g. (1 mole) of 2,5-dimethylphenol and 360 g. (2 moles) of 25% dimethylamine in 200 ml. of ethanol was added 162 g. (2 moles) of 37% aqueous formaldehyde dropwise with cooling to keep the temperature below 30° C. Carbon disulfide (77 g., 1 mole) was then added and the reaction mixture was heated under reflux for four hours. It was then poured into water and the precipitate which formed was filtered off and washed with ethanol. The yield of 2,5-dimethyl-3-(dimethylaminomethyl)-4-hydroxybenzyl N,N-dimethyldithiocarbamate was 272 g., 91%, M.P. 143–145° C. after recrystallization from ethanol.

EXAMPLE 7

*The preparation of 2,3-dimethyl-4-hydroxy-5-(dimethylaminomethyl)benzyl N,N-dimethyldithiocarbamate*

Using the method described in Example 1, 2,3-dimethylphenol was converted to 2,3-dimethyl-4-hydroxy-5-(dimethylaminomethyl)benzyl N,N-dimethyldithiocarbamate in 91% yield, M.P. 90–91° C. after recrystallization from methanol.

EXAMPLE 8

*The preparation of 2-t-butyl-4-(morpholinothiocarbonylthiomethyl)-6-(morpholinomethyl)phenol*

To a solution of 75 g. (0.5 mole) of o-t-butylphenol and 87 g. (1 mole) of morpholine in 400 ml. of ethanol was added 84 g. (1.05 moles) of 37% aq. formaldehyde with cooling to keep the temperature below 30° C. The solution was stirred at room temperature for 1½ hours and then was heated at reflux for 2½ hours. The solution was cooled to 50° C. Carbon disulfide (53 g., 0.7 mole) was then added and the solution was heated at reflux for one hour.

The reaction mixture was diluted with water and the product which separated was extracted with ether. The ether layer was then shaken with dilute hydrochloric acid and the acidic extract was separated and neutralized with aqueous sodium carbonate. The product which separated was extracted with ether, washed with water, dried over anhyd. sodium sulfate and evaporated down to yield 115 g. (55%) of 2-t-butyl-4-(morpholinothiocarbonylthiomethyl)-6-(morpholinomethyl)phenol, M.P. 71–73° C. after recrystallization from hexane.

EXAMPLE 9

*The preparation of 2-t-butyl-4-(piperidinothiocarbonylthiomethyl)-6-(piperidinomethyl)phenol*

To a solution of 75 g. (0.5 mole) of o-t-butylphenol and 85 g. (1 mole) of piperidine in 400 ml. of ethanol was added 84 g. (1.05 moles) of 37% aq. formaldehyde with cooling to keep the temperature below 30° C. The solution was stirred at room temperature for one hour and then was heated at reflux for 3 hours. The solution was then cooled to 50° C. Carbon disulfide (53 g., 0.7 mole) was then added and the solution was heated at reflux for two hours.

The reaction mixture was diluted with water and the product which separated was extracted with ether. The ether layer was then shaken with dilute hydrochloric acid and the acidic extract was separated and neutralized with aqueous sodium carbonate. The product which separated was extracted with ether, washed with water, dried over anhyd. sodium sulfate and evaporated down to yield 122 g. (58%) of 2-t-butyl-4-(piperidinothiocarbonylthiomethyl)-6-piperidinomethyl)phenol, M.P. 94–95° C. after recrystallization from acetone.

EXAMPLE 10

*The preparation of 3-cyclohexyl-4-hydroxy-5-(dimethylaminomethyl)benzyl N,N-dimethyldithiocarbamate*

To a solution of 88 g. (0.5 mole) of o-cyclohexylphenol and 190 g. (1.05 moles) of 25% aq. dimethylamine in 500 ml. of ethanol was added 84 g. (1.05 moles) of 37% aq. formaldehyde with cooling to keep the temperature below 30° C. The solution was stirred at room temperature for one hour and then was heated at reflux for two hours. The solution was cooled, carbon disulfide (53 g., 0.7 mole) was added, and the solution was heated at reflux for two hours.

The reaction mixture was diluted with water and the product was extracted with benzene. The benzene layer was filtered to remove some insoluble material. It was then shaken with dilute hydrochloric acid and the acidic extract was separated and neutralized with aqueous sodium carbonate. The product which separated was extracted with benzene, washed with water, dried over anhyd. sodium sulfate and evaporated down to yield 127 g. (74%) of 3-cyclohexyl-4-hydroxy-5-(dimethylaminomethyl)benzyl, N,N-dimethyldithiocarbamate, M.P. 98–100° C. after recrystallization from hexane.

EXAMPLE 11

*The preparation of 3-cyclooctyl-4-hydroxy-5-(dimethylaminomethyl)benzyl N,N-dimethyldithiocarbamate*

To a solution of 62 g. (0.19 mole) of o-cyclooctylphenol and 68.4 g. (0.38 mole) of 25% aq. dimethylamine in 200 ml. of ethanol was added 30.8 g. (0.38 mole) of 37% aqueous formaldehyde with cooling to keep the temperature below 30° C. Carbon disulfide (14.4 g., 0.19 mole) was added and the solution was heated at reflux for five hours.

The reaction mixture was diluted with water and the product was extracted with ether. The ether layer was then shaken with dilute hydrochloric acid and the acidic extract was separated and neutralized with aqueous sodium carbonate. The product which separated was extracted with ether, washed with water, dried over anhyd. sodium sulfate and evaporated down to yield 3-cyclooctyl-4-hydroxy-5-(dimethylaminomethyl)benzyl N,N-dimethyldithiocarbamate as a liquid residue.

EXAMPLE 12

This example demonstrates the effectiveness of the chemicals of this invention as agricultural protective fungicides as tested against *Alternaria solani*, the causal organism of tomato early blight.

Sixteen hundredths (0.16) gram of the chemical to be tested was dissolved in twenty ml. of acetone and 60 mg. of a non-ionic surface-active agent (a condensation product of an alkyl phenol and ethylene oxide). The acetone and surface-active agent are known to be inactive in the biological tests run. The mixture was diluted serially with distilled water, giving in some cases suspensions containing 500 to 2000 parts per million (p.p.m.) and in other cases 50, 200 and 800 p.p.m. of the chemical. These suspensions were sprayed on duplicate six inch tomato plants (variety Clark's Early Special) using a gun-type sprayer which delivered 2.5 ml. per second. The plants were then placed in the greenhouse, together with untreated check plants. Twenty-four hours later the treated and untreated check plants were inoculated with a suspension of *Alternaria solani* spores by means of a 20 second spray from an atomizer sprayer (delivery rate 1 ml. per second). The plants were then kept overnight in a control chamber at a temperature of 75° F. and 100% relative humidity. In the morning the plants were transferred to the greenhouse. Three days later the disease was scored by comparing the number of disease lesions of the treated plants with the untreated check.

The formula to determine percent control is:

$$100 - \left(\frac{\text{Ave. No. lesions on treated plant}}{\text{Ave. No. lesions on untreated plant}} \times 100\right) = \text{Percent control}$$

The results of the tests are shown in the following table:

| Compound | Percent Disease Control | | |
|---|---|---|---|
| | 50 p.p.m. | 200 p.p.m. | 800 p.p.m. |
| 3-methyl-4-hydroxy-5-(dimethylaminomethyl)benzyl N,N-dimethyldithiocarbamate | 85 | 90 | 95 |
| 3-t-butyl-4-hydroxy-5-(dimethylaminomethyl)benzyl N,N-dimethyldithiocarbamate | 89 | 94 | 97 |
| 3-cyclohexyl-4-hydroxy-5-(dimethylaminomethyl)benzyl N,N-dimethyldithiocarbamate | 45 | 74 | 93 |
| 3-cyclooctyl-4-hydroxy-5-(dimethylaminomethyl)benzyl N,N-dimethyldithiocarbamate | 58 | 80 | 94 |
| 3-isopropyl-4-hydroxy-5-(dimethylaminomethyl)benzyl N,N-dimethyldithiocarbamate | 42 | 57 | 89 |
| 3-sec-butyl-4-hydroxy-5-(dimethylaminomethyl)benzyl N,N-dimethyldithiocarbamate | 51 | 74 | 94 |

| Compound | Percent Disease Control | |
|---|---|---|
| | 500 p.p.m. | 2,000 p.p.m. |
| 3-methyl-4-hydroxy-5-(dibutylaminomethyl)benzyl N,N-dibutyldithiocarbamate | 72 | |
| 3-methyl-4-hydroxy-5-(ethylisopropylaminomethyl)benzyl N-ethyl-N-isopropyldithiocarbamate | 91 | 98 |
| 3-methyl-4-hydroxy-5-[di(beta-hydroxyethyl)aminomethyl]benzyl N,N-di(beta-hydroxyethyl)dithiocarbamate | 55 | 70 |
| 2,5-dimethyl-3-(dimethylaminomethyl)-4-hydroxybenzyl N,N-dimethyldithiocarbamate | 81 | 97 |
| 2,3-dimethyl-4-hydroxy-5-(dimethylaminomethyl)benzyl N,N-dimethyldithiocarbamate | 95 | 95 |
| 2-t-butyl-4-(morpholinothiocarbonylthiomethyl)-6-(morpholinomethyl)phenol | 44 | 47 |
| 2-t-butyl-4-(piperidinothiocarbonylthiomethyl)-6-(piperidinomethyl) phenol | 50 | 58 |

EXAMPLE 13

This example demonstrates the effectiveness of the chemicals of this invention as bactericides as tested by the agar plate technique.

Thirty-five mg. of 3-methyl-4-hydroxy-5-(dimethylaminomethyl)benzyl N,N-dimethyldithiocarbamate was dissolved in 5 ml. of acetone to which was added 45 ml. of a 0.01% aqueous solution of a non-ionic surface-active wetting agent (isooctyl phenyl polyethoxy ethanol). Three ml. of this chemical preparation was pipetted into a 50 ml. Erlenmeyer flask containing 5 ml. nutrient medium and kept liquified in a water bath at 47° C. The bacterial inoculum consisting of a spore suspension of *Pseudomonas aeruginosa* was then added to this preparation at the amount of 0.25 ml. per flask. Thus the flask contained a chemical concentration of 255 p.p.m. The preparation was then poured into 2½" Petri plates and incubated at 30° C. Similar tests were made at a concentration of the chemical of 128 p.p.m. The results were taken 24 hours later by examining the plates for bacterial growth with a bacterial colony counter and comparing the chemical treatment with an untreated, inoculated check.

The untreated, inoculated (check) test showed severe bacterial growth, whereas the test with the 3-methyl-4-hydroxy-5-(dimethylaminomethyl)benzyl N,N - dimethyldithiocarbamate showed no bacterial growth at 128 p.p.m. or 255 p.p.m. of the chemical.

EXAMPLE 14

This example illustrates the effectiveness of the chemicals of this invention as industrial bactericides as tested against the anaerobic bacterium *Desulfovibri desulfuricans*, a deteriorative agent in secondary oil recovery procedures, fuel storage tanks, pipelines, etc.

This test was conducted according to the American Petroleum Institute "Recommended Practice for Biological Analysis of Water-Flood Injection Waters," API–RP 38, First Edition, May 1959, Section II. In the test, weighed portions of the compounds were dissolved in 10 ml. of an appropriate solvent (acetone, isopropanol, distilled water), transferred to 90 ml. of distilled water containing three drops per liter of a non-ionic surface-active agent (isooctyl phenyl polyethoxy ethanol). Aliquots were removed from this stock solution (usually containing 1000 or 100 p.p.m. of chemical) to sterile, screwcapped, clear one ounce bottles sufficient to obtain a final concentration of 1, 5, 50 and 100 p.p.m. To each bottle was added sulfate reducing broth inoculated with *Desulfovibrio desulfuricans* (1.5%). The recipe for the sulfate reduction broth was as follows:

| | |
|---|---|
| Sodium lactate, U.S.P. | 4.0 ml. |
| Yeast extract | 1.0 gm. |
| Ascorbic acid | 0.1 gm. |
| $MgSO_4 7H_2O$ | 0.2 gm. |
| $K_2HPO_4$ (anhydrous) | 0.01 gm. |
| $Fe(SO_4)_2 (NH_4)_2 6H_2O$ | 0.1 gm. |
| Sodium chloride | 10.0 gms. |
| Distilled water | 1000.0 mls. | pH adjusted to 7.5.

The caps were replaced and the bottles incubated at 32–35° C. with daily observations for one week and weekly observations thereafter for a total of 4 weeks' incubation.

The results of the test are shown in the following table:

| Compound | Concentration (in p.p.m.) | | | | |
|---|---|---|---|---|---|
| | 100 | 50 | 10 | 5 | 1 |
| 3-methyl-4-hydroxy-5-(dimethylaminomethyl)benzyl N,N-dimethyldithiocarbamate | − | − | − | − | + |
| 3-t-butyl-4-hydroxy-5-(dimethylaminomethyl)benzyl N,N-dimethyldithiocarbamate | − | − | − | + | + |
| 3-cyclohexyl-4-hydroxy-5-(dimethylaminomethyl)benzyl N,N-dimethyldithiocarbamate | − | − | + | + | + |
| 3-cyclooctyl-4-hydroxy-5-(dimethylaminomethyl)benzyl N,N-dimetuyldithiocarbamate | − | − | + | + | + |
| 3-isopropyl-4-hydroxy-5-(dimethylaminomethyl)benzyl N,N-dimethyldithiocarbamate | − | − | + | + | + |
| 3-sec-butyl-4-hydroxy-5-(dimethylaminomethyl)benzyl N,N-dimethyldithiocarbamate | − | − | + | + | + |
| 3-methyl-4-hydroxy-5-(ethylisopropylaminomethyl)benzyl N-ethyl-N-isopropyldithiocarbamate | − | + | + | + | + |
| 2,5-dimethyl-3-(dimethylaminomethyl)-4-hydroxybenzyl N,N-dimethyldithiocarbamate | − | − | + | + | + |
| 2,3-dimethyl-4-hydroxy-5-(dimethylaminomethyl)benzyl N,N-dimethyldithiocarbamate | − | − | − | − | + |
| 2-t-butyl-4-(piperidinothiocarbonylthiomethyl)-6-(piperidinomethyl)phenol | − | − | + | + | + |

+ = Growth and Media Blackening.
− = No Growth or Blackening.

EXAMPLE 15

This example demonstrates the effectiveness of the chemicals of the invention as material preservatives against the various degradative bacteria and fungi causing deterioration of textiles, paper, wood, etc.

Samples of ten ounce cotton duck (70 lbs. breaking strength) were treated with acetone solutions of the chemicals and dried at 60–65° C. for 15 minutes, giving a deposition of 1% of the chemical on the fibers. Generally 0.1% to 10% of the chemical based on the weight of the material being treated will be used in practice. Samples were then tested according to Federal Specification CCC–T–191b, Textile Test Methods, Method 5762, Soil Burial Method. The test was carried out as follows: Strips, 2 x 6 inches of the thus treated fabric and strips of untreated control fabric were buried vertically by inserting the material into test soil to a depth of 5 inches. The soil was microbiologically active, had a pH of about 6.5, a moisture content of about 25%, and contained microorganisms such as *Trichoderma lignorun*, *Myrothecium verrucaria*, *Alternania solani*, *Chaetonium globosum*, *Fusarium moniliforme*, *Aspergillus ustus*, *Penecillium* spp.

The soil beds were maintained at 28–32° C. and 85–95% relative humidity. After 14 days burial, the specimens were removed, gently washed and dried. Some of the strips were leached by 24 hours immersion with six hand changes in water. The breaking strengths of the treated and untreated control strips were determined for comparison of loss of breaking strength of the treated fabric with the untreated control.

| Compound | Loss in Breaking Strength (in lbs.) | |
|---|---|---|
| | Unleached | Leached |
| 3-methyl-4-hydroxy-5-(dimethylaminomethyl) benzyl N,N-dimethyldithiocarbamate | 5 | 60 |
| 3-t-butyl-4-hydroxy-5-(dimethylaminomethyl) benzyl N,N-dimethyldithiocarbamate | 52 | 0 |
| Untreated control | 73 | 73 |

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of controlling microorganisms which comprises applying to a medium which normally supports the growth of microorganisms a compound having the formula

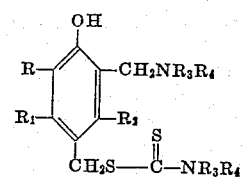

wherein R is alkyl of 1 to 12 carbon atoms, cycloalkyl of 5 to 8 carbon atoms or aralkyl of 7 to 9 carbon atoms, $R_1$ and $R_2$ are hydrogen or methyl, $R_3$ and $R_4$ are alkyl having 1 to 5 carbon atoms each or are joined to form with the nitrogen atom morpholinyl, pyrrolidinyl or piperidinyl groups.

2. The method of controlling bacteria and fungi which comprises contacting bacteria and fungi with a compound having the formula

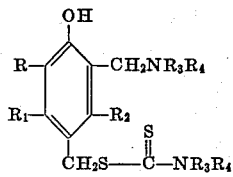

wherein R is alkyl of 1 to 12 carbon atoms, cycloalkyl of 5 to 8 carbon atoms or aralkyl of 7 to 9 carbon atoms, $R_1$ and $R_2$ are hydrogen or methyl, $R_3$ and $R_4$ are alkyl having 1 to 5 carbon atoms each or are joined to form with the nitrogen atom morpholinyl, pyrrolidinyl or piperidinyl groups.

3. The method of controlling bacteria and fungi which comprises applying to loci subject to attack by bacteria and fungi a compound having the formula

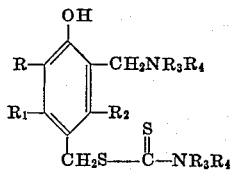

wherein R is alkyl of 1 to 12 carbon atoms, cycloalkyl of 5 to 8 carbon atoms or aralkyl of 7 to 9 carbon atoms, $R_1$ and $R_2$ are hydrogen or methyl, $R_3$ and $R_4$ are alkyl having 1 to 5 carbon atoms each, or are joined to form with the nitrogen atom morpholinyl, pyrrolidinyl or piperidinyl groups.

4. The method of controlling fungi on plants which comprises contacting plants with a compound having the formula

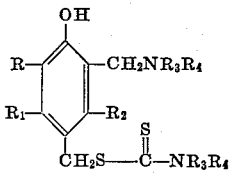

wherein R is alkyl of 1 to 12 carbon atoms, cycloalkyl of 5 to 8 carbon atoms or aralkyl of 7 to 9 carbon atoms, $R_1$ and $R_2$ are hydrogen or methyl, $R_3$ and $R_4$ are alkyl having 1 to 5 carbon atoms each or are joined to form with the nitrogen atom morpholinyl, pyrrolidinyl or piperidinyl groups.

5. The method of protecting material capable of nourishing bacteria and fungi from destruction by such pests which comprises bringing the material into contact with a compound having the formula

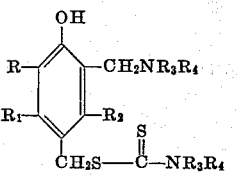

wherein R is alkyl of 1 to 12 carbon atoms, cycloalkyl of 5 to 8 carbon atoms or aralkyl of 7 to 9 carbon atoms, $R_1$ and $R_2$ are hydrogen or methyl, $R_3$ and $R_4$ are alkyl having 1 to 5 carbon atoms each or are joined to form with the nitrogen atom morpholinyl, pyrrolidinyl or piperidinyl groups.

6. Material normally subject to microbiological decomposition but made resistant to such decomposition by having incorporated therein a compound having the formula

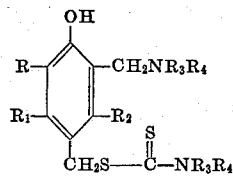

wherein R is alkyl of 1 to 12 carbon atoms, cycloalkyl of 5 to 8 carbon atoms or aralkyl of 7 to 9 carbon atoms, $R_1$ and $R_2$ are hydrogen or methyl, $R_3$ and $R_4$ are alkyl having 1 to 5 carbon atoms each or are joined to form with the nitrogen atom morpholinyl, pyrrolidinyl or piperidinyl groups.

7. Cellulosic material impregnated with a compound having the formula

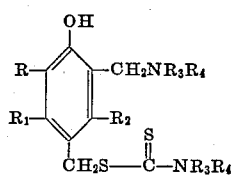

wherein R is alkyl of 1 to 12 carbon atoms, cycloalkyl of 5 to 8 carbon atoms or aralkyl of 7 to 9 carbon atoms, $R_1$ and $R_2$ are hydrogen or methyl, $R_3$ and $R_4$ are alkyl having 1 to 5 carbon atoms each or are joined to form with the nitrogen atom morpholinyl, pyrrolidinyl or piperidinyl groups.

8. Fabric having incorporated therein a compound having the formula

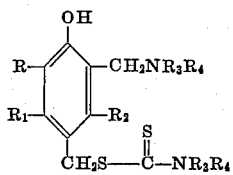

wherein R is alkyl of 1 to 12 carbon atoms, cycloalkyl of 5 to 8 carbon atoms or aralkyl of 7 to 9 carbon atoms, $R_1$ and $R_2$ are hydrogen or methyl, $R_3$ and $R_4$ are alkyl having 1 to 5 carbon atoms each or are joined to form with the nitrogen atom morpholinyl, pyrrolidinyl or piperidinyl groups.

9. The method of controlling microorganisms which comprises applying 3-methyl-4-hydroxy-5-(dimethylaminomethyl)benzyl N,N-dimethyldithiocarbamate to a medium which normally supports the growth of microorganisms.

10. The method of controlling microorganisms which comprises applying 3-t-butyl-4-hydroxy-5-(dimethylaminomethyl)benzyl N,N-dimethyldithiocarbamate to a medium which normally supports the growth of microorganisms.

11. The method of controlling microorganisms which comprises applying 3-cyclooctyl-4-hydroxy-5-(dimethylaminomethyl)benzyl N,N-dimethyldithiocarbamate to a medium which normally supports the growth of microorganisms.

12. The method of controlling microorganisms which comprises applying 2,3-dimethyl-4-hydroxy-5-(dimethylaminomethyl)benzyl N,N-dimethyldithiocarbamate to a medium which normally supports the growth of microorganisms.

13. The method of controlling microorganisms which comprises applying 2,5-dimethyl-3-(dimethylaminomethyl)-4-hydroxybenzyl N,N-dimethyldithiocarbamate to a medium which normally supports the growth of microorganisms.

14. The method of controlling fungi on plants which comprises applying 3-methyl-4-hydroxy-5-(dimethylaminomethyl)benzyl N,N-dimethyldithiocarbamate to plants.

15. The method of controlling fungi on plants which comprises applying 3-t-butyl-4-hydroxy-5-(dimethylaminomethyl)benzyl N,N-dimethyldithiocarbamate to plants.

16. The method of controlling fungi on plants which comprises applying 3-cyclooctyl-4-hydroxy-5-(dimethylaminomethyl)benzyl N,N-dimethyldithiocarbamate to plants.

17. The method of controlling fungi on plants which comprises applying 2,3-dimethyl-4-hydroxy-5-(dimethylaminomethyl)benzyl N,N-dimethyldithiocarbamate to plants.

18. The method of controlling fungi on plants which comprises applying 2,5-dimethyl-3-(dimethylaminomethyl)-4-hydroxybenzyl N,N-dimethyldithiocarbamate to plants.

No references cited.

JULIAN S. LEVITT, *Primary Examiner.*

STANLEY J. FRIEDMAN, *Assistant Examiner.*